(12) United States Patent
Nicholas et al.

(10) Patent No.: US 9,358,469 B1
(45) Date of Patent: Jun. 7, 2016

(54) SYSTEM AND METHOD FOR PROVIDING AN INTER-SPORT FANTASY SPORTS CHALLENGE

(71) Applicant: Sports Technologies LLC, Canton, CT (US)

(72) Inventors: Christopher J. Nicholas, Avon, CT (US); Michael P. Szahaj, Manchester, CT (US); Aaron Whitlock, Canton, CT (US)

(73) Assignee: SPORTS TECHNOLOGIES LLC, Canton, CT (US)

( * ) Notice: Subject to any disclaimer, the term of this patent is extended or adjusted under 35 U.S.C. 154(b) by 0 days.

(21) Appl. No.: 14/794,467

(22) Filed: Jul. 8, 2015

(51) Int. Cl.
*A63F 13/828* (2014.01)
*A63F 13/795* (2014.01)
*A63F 13/46* (2014.01)
*A63F 13/798* (2014.01)
*A63F 13/35* (2014.01)

(52) U.S. Cl.
CPC ............... *A63F 13/828* (2014.09); *A63F 13/35* (2014.09); *A63F 13/46* (2014.09); *A63F 13/795* (2014.09); *A63F 13/798* (2014.09)

(58) Field of Classification Search
USPC .............................................. 463/3, 4, 31, 42
See application file for complete search history.

(56) References Cited

U.S. PATENT DOCUMENTS

| | | | | |
|---|---|---|---|---|
| 2006/0252476 A1* | 11/2006 | Bahou | ..................... | A63F 13/12 463/4 |
| 2009/0023495 A1* | 1/2009 | Koustas | ................. | G06Q 50/34 463/25 |
| 2011/0319171 A1* | 12/2011 | Ngozika | ................. | A63F 13/12 463/42 |
| 2013/0337921 A1* | 12/2013 | Butz, Jr. | .................. | A63F 13/12 463/42 |
| 2014/0031105 A1* | 1/2014 | Givant | ................ | G07F 17/3276 463/25 |
| 2014/0045595 A1* | 2/2014 | Baschnagel, III | ....... | A63F 13/10 463/40 |
| 2015/0005076 A1* | 1/2015 | Stephenson, Jr. | ....... | A63F 13/87 463/42 |
| 2015/0209679 A1* | 7/2015 | Givant | .................. | A63F 13/828 463/25 |

* cited by examiner

*Primary Examiner* — Pierre E Elisca
(74) *Attorney, Agent, or Firm* — Leason Ellis LLP

(57) ABSTRACT

Systems and methods are provided for an inter-sport fantasy sports challenge. According to one aspect, a set of players is provided to each user, where each player competes in one of a plurality of sports. A roster selected from the set of players is received from each user. Rosters include players selected without regard to a respective sport and a respective position, and can include players from multiple sports. In another aspect, rosters include prescribed numbers of players and positions, and the respective rosters as between at least two users include players from multiple sports. Performance data for each player is received. A player point value for each player is calculated and converted into normalized values using one or more piecewise-defined non-linear functions for each sport. A roster score is calculated by aggregating normalized values for each player on the roster, and users are ranked based on roster scores.

20 Claims, 9 Drawing Sheets

SYSTEM AND METHOD FOR PROVIDING AN INTER-SPORT FANTASY SPORTS CHALLENGE

FIELD OF THE INVENTION

The present application relates, generally, to systems and methods for fantasy sports. In particular, the present application relates to systems and methods for providing an inter-sport fantasy sports challenge.

BACKGROUND OF THE INVENTION

Fantasy sports have quickly become a phenomenon for sports fans, with millions of people participating in fantasy sports games each year. These interactive fantasy sports games have been developed for many different sports—including professional sports and some collegiate sports—leading to increased interest in those sports from fans. For instance, participation in fantasy sports games has resulted in participants having greater interest in teams and players outside of their favorite teams.

Most fantasy sports games are specific to one sport, and are generally run congruently with the active season of the particular sport. However, most fantasy games limit a user to selecting a preselected number of players for each position in the particular sport such that the user's team can be fairly compared with a competing user's team. Additionally, for many fantasy games, certain players at certain positions have higher average scores than players at other positions, thus making certain players of certain positions a higher priority for selection than players of other positions.

As such, there is a need for fantasy sports games that are free of the restrictions on the position type or sport of the players selected by the user. Further, there is a need for a way to fairly compare players at different positions and/or in different sports for scoring in fantasy sports games.

SUMMARY OF THE INVENTION

A system and method for providing an inter-sport fantasy sports challenge are disclosed.

According to one aspect, a method for providing an inter-sport fantasy sports challenge is provided in which a fantasy sports challenge is commenced by a computing device and permits a plurality of users using respective user computing devices to join the challenge. The method provides, over a communication network to each of the plurality of users, a set of players, such that each of the players in the set competes in a respective sport among a plurality of different sports. A roster comprising a selection of players among the set of players is received by the computing device from each respective users over the communication network, such that each roster includes a prescribed number of players selected without regard to a respective sport and a respective position. The respective rosters may include players from more than one sport as between at least two of the respective users. Further, performance data relating to each one of the players during a preceding event interval is received by the computing device. The method further calculates a respective player point value for each of the players based on the received performance data using a fantasy scoring methodology for the respective sport in which the player competes. The method then converts the calculated player point value into a respective normalized value on a common point value scale by inputting the calculated player point value into a plurality of piecewise-defined non-linear functions, such that each of the piecewise-defined non-linear functions is defined for a respective one of the plurality of sports. The method further calculates a respective roster score for each user by aggregating the normalized values for each player on each roster, and ranks the plurality of users based on their calculated roster scores. The challenge is concluded by recording one or more winners of the challenge based on the ranking, and providing the ranking to the plurality of users by the processor over a network.

According to another aspect, a method for providing an inter-sport fantasy sports challenge is provided in which one or more of the piecewise-defined non-linear functions for each of the plurality of sports are constructed by the computing device. In one implementation, the piecewise-defined non-linear functions are continuous functions. In the same or another implementation, the method constructs the piecewise-defined non-linear functions for each sport by: receiving historical performance data relating to the set of players for one or more event intervals within a look-back period; identifying a subset of those players that are statistically relevant during the look-back period; calculating player point values for each player in the subset for the one or more event intervals within a look-back period; and calculating the mean and standard deviation of the calculated player point values for each sport. In combination with any of the foregoing implementations, one or more smoothing functions can be applied to the piecewise-defined non-linear functions such that the smoothing function modifies the slope of the piecewise-defined non-linear functions for a prescribed range of calculated player point values.

According to another aspect, a method for providing an inter-sport fantasy sports challenge is provided in which the roster received by the computing device from each respective user includes a prescribed number of players having prescribed positions, and the respective rosters as between at least two of the users includes players from two or more of the plurality of the different sports. Other features and advantages of the present invention will become apparent from the following description of the invention that refers to the accompanying drawings.

BRIEF DESCRIPTION OF DRAWING FIGURES

Further aspects of the present disclosure will be more readily appreciated upon review of the detailed description of its various embodiments, described below, when taken in conjunction with the accompanying drawings, of which:

Figure 8:
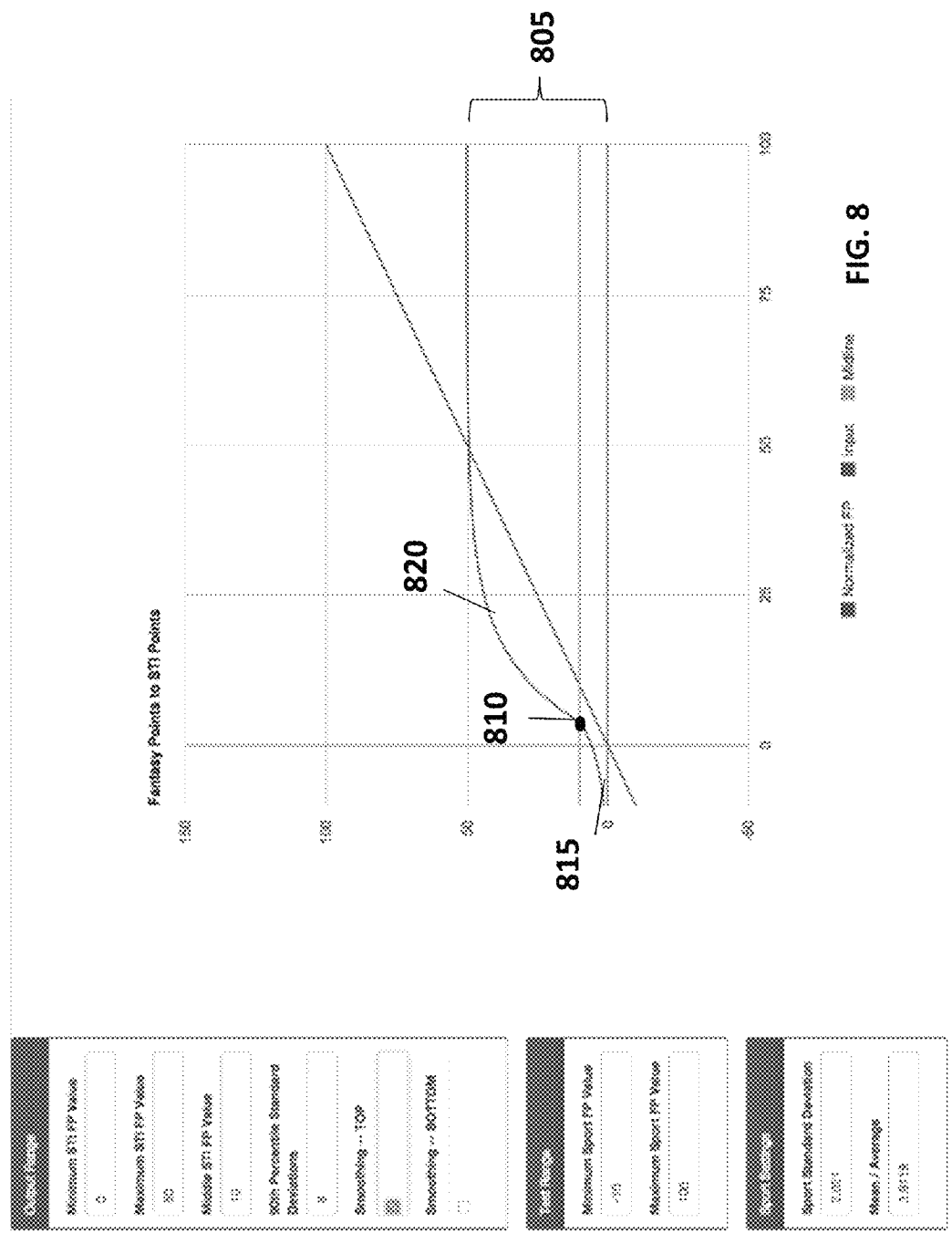
Figure 9:
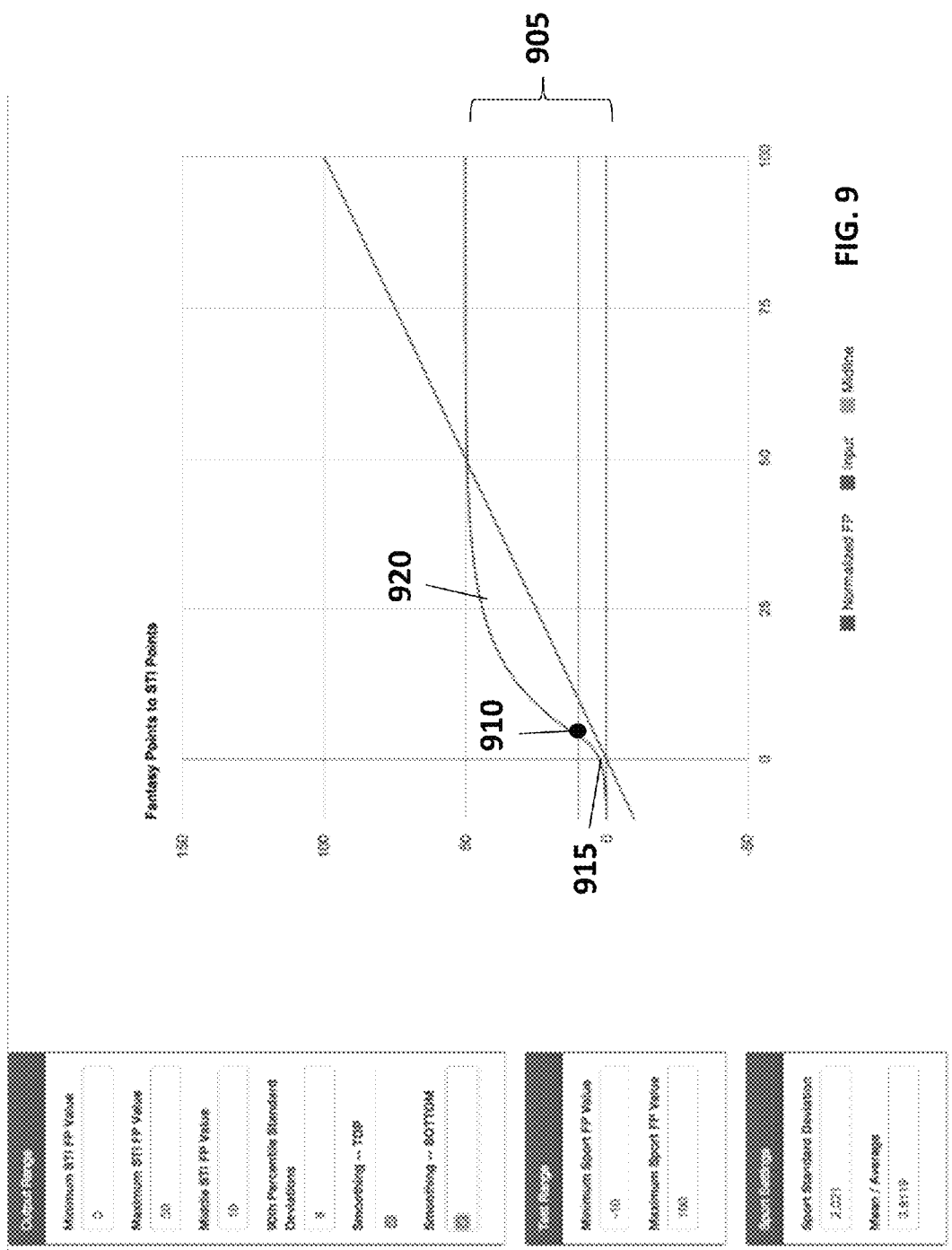

FIG. 8 is a graphical representation of another alternative piecewise-defined non-linear function for the determination of normalized point values in accordance with one or more embodiments of the present application; and FIG. 9 is a graphical representation of another alternative piecewise-defined non-linear function for the determination of normalized point values in accordance with one or more embodiments of the present application.

DETAILED DESCRIPTION OF CERTAIN EMBODIMENTS

By way of overview and introduction, the present disclosure details systems and methods for providing inter-sport fantasy sports challenges. As conventional approaches limit a user's player selection by the players' position in their respective sport, the present systems and methods, in certain embodiments, allow for player selection that is not dependent upon a player's position in his or her respective sport. Further, as conventional approaches have been unable to fairly compare players at different positions and in different sports for scoring in a fantasy sports game, the present systems and methods utilize piecewise-defined non-linear functions to normalize the point total of players in different positions and/or in different sports to produce comparable point totals for each player.

Thus, in accordance with one or more embodiments of the present application, systems and methods for a fantasy sports challenge are disclosed in which a plurality of users selects one or more players for their respective rosters, with the available players being from two or more different sports. In certain embodiments, a user can fill his or her roster of players by selecting players regardless of their position in their respective sports. In an alternative embodiment, each user can fill his or her roster with a prescribed number of players having prescribed positions, and the respective rosters as between at least two of the users includes players from two or more sports.

When the rosters for each user have been selected, each selected player receives a point value based on his or her performance over a prescribed period of time (e.g., one day, one week, one game, etc.). For instance, in one or more implementations, the fantasy sports challenge can be a daily challenge, where each user selects a roster for the day, and then competes with other users for that day. In this implementation, the roster would only be valid for games that occurred on that day and a winner is declared after all the games of that day are completed. If a user wants a rematch on a subsequent day with the same users or a new challenge with different users, new rosters are then selected by the users for the rematch or new challenge. The point value that each player receives is then converted into a normalized value such that each player's normalized value can be compared fairly regardless of the player's position or sport. For example, the original point value for a quarterback in football (typically, a high value in fantasy football) and the original point value for a catcher in baseball (typically, a low value in fantasy baseball) are standardized such that their normalized values are comparable to one another. In certain embodiments, the normalization of point values can allow each player's value to be based on the player's performance relative to the average player at their position in that sport rather than being relative to the performance of players at all other positions in that particular sport. For example, this would put catchers and first basemen in baseball on equal footing in terms of normalized value, even though first basemen, on average, have better offensive statistics (e.g., homeruns, runs batted in [RBIs]) as compared with catchers. Further, the normalization of point values allows players from different sports to be compared on the same scale. As such, in one or more embodiments, a user can select his or her roster without being limited to selecting certain players based on their position and/or their sport. This conversion from original point value (player point value) to normalized value can be accomplished by inputting the original point value into a plurality of piecewise-defined non-linear functions.

The referenced systems and methods for providing inter-sport fantasy sports challenges are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

Figure 1:
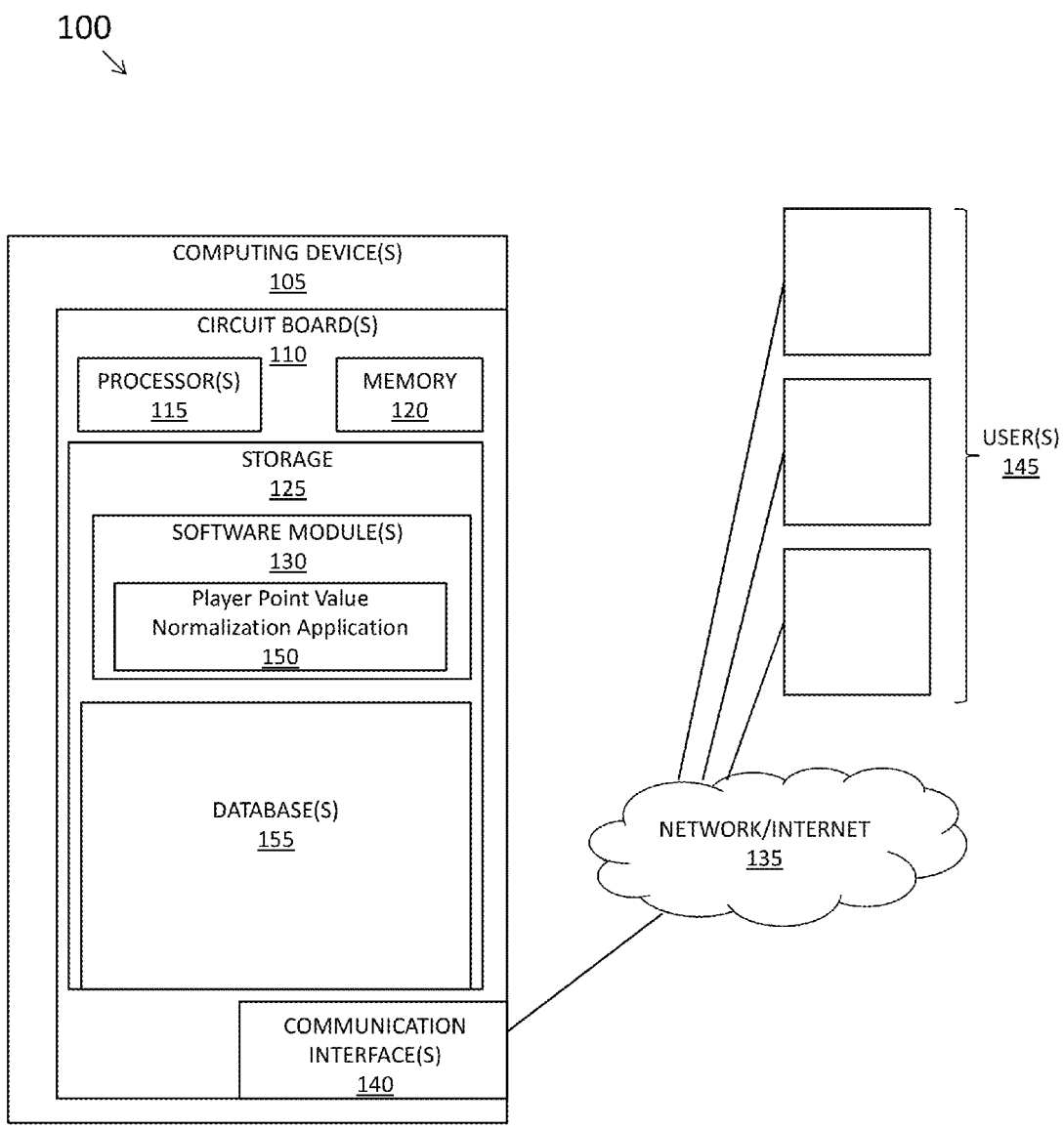
FIG. 1 is a high-level diagram illustrating an exemplary configuration of an inter-sport fantasy sports challenge system in accordance with one or more embodiments of the present application.

An exemplary computer system is shown in FIG. 1, which is a high-level diagram illustrating an exemplary configuration of an inter-sport fantasy sports challenge system 100. The system 100 includes one or more computing devices 105. In one arrangement, computing device(s) 105 a can be a personal computer or server. In other implementations, computing device(s) 105 can be a tablet computer, a laptop computer, or a mobile device/smartphone, for example. It should be understood that computing device 105 of the system 100 can be practically any computing device and/or data processing apparatus capable of embodying the systems and/or methods described herein. As understood by those of skill in the art, the computing device 105 can comprise a host machine that runs one or more of the modules in a virtualized environment, and, as such, can be scaled or executed on a variety of machines.

Computing device(s) 105 includes one or more circuit boards 110, such as a motherboard, which are operatively connected to various hardware and software components that serve to enable operation of the inter-sport fantasy sports challenge system 100. The circuit board(s) 110 are operatively connected to one or more hardware processors 115 and at least one non-volatile memory 120. Processor(s) 115 serve to execute instructions for software that can be loaded into memory 120. Processor 115 can be a number of processors, including a multi-core processor, depending on the particular implementation. Also, in a virtualized environment, the processors can be allocated to respective virtual machines which have been configured by code to implement the functionality described herein. Further, processor(s) 115 can be implemented using a number of heterogeneous processor systems in which a main processor is present with secondary processors on a single chip. As another illustrative example, processor 115 can be a symmetric multi-processor system containing multiple processors of the same type.

Continuing with FIG. 1, memory 120 and/or storage 125 are preferably accessible by processor(s) 115, thereby enabling processor(s) 115 to receive and execute instructions stored on memory 120 and/or on storage 125. Memory 120 can be, for example, at least one random access memory (RAM) or any other suitable volatile or non-volatile computer readable storage medium. In addition, memory 120 can be fixed or removable. Storage 125 can take various forms, depending on the particular implementation. For example, storage 125 can contain one or more components or devices such as a hard drive, a flash memory, a rewritable optical disk, a rewritable magnetic tape, or some combination of the above. Storage 125 also can be fixed or removable. In a preferred implementation, the storage 125 can be network-attached storage that is a magnetic hard drive or solid state hard drive/flash hard drive. In this implementation, the network-attached storage can be used for one or more software modules 130 (programs) and database storage.

One or more software modules 130 are encoded in storage 125 and/or in memory 120. The software modules 130 can comprise one or more software programs or applications having computer program code or a set of instructions executed in processor 115. Such computer program code or instructions for carrying out operations for aspects of the systems and methods disclosed herein can be written in any combination of one or more programming languages, including an object oriented programming language, such as Ruby, Java, Smalltalk, C++, Python, and JavaScript, or the like, a special-purpose programming language, such as SQL, PLSQL, or the like, and conventional procedural programming languages, such as the "C" programming language or similar programming languages. The program code can execute entirely on computing device(s) 105, partly on computing device(s) 105, as a stand-alone software package, partly on computing device(s) 105 and partly on a remote computer/device, or entirely on the remote computer/device or server. In the latter scenario, the remote computer can be connected to computing device(s) 105 through any type of network, including a local area network (LAN) or a wide area network (WAN), or the connection can be made to an external computer (for example, through the Network/Internet 135 using an Internet Service Provider).

One or more software modules 130, including program code/instructions, are located in a functional form on one or more computer readable storage devices (such as memory 120 and/or storage 125) that can be selectively removable. The software modules 130 can be loaded onto or transferred to computing device(s) 105 for execution by processor(s) 115. It can also be said that the program code of software modules 130 and one or more computer readable storage devices (such as memory 120 and/or storage 125) form a computer program product that can be manufactured and/or distributed in accordance with the present disclosure, as is known to those of ordinary skill in the art.

It should be understood that in some illustrative embodiments, one or more of software modules 130 can be downloaded over a network to storage 125 via one or more communication interfaces 140 from another device or system (e.g., user computing device(s) 145) for use within the inter-sport fantasy sports challenge system 100. For instance, program code stored in a computer readable storage device in a server can be downloaded over a network from the server to the system 100.

Preferably, included among the software modules 130 is a player point value (PPV) normalization application 150, which is executed by processor 115. During execution of the software modules 130, and specifically the PPV normalization application 150, the processor 115 configures the circuit board 110 to perform various operations relating to the inter-sport fantasy sports challenge with computing device(s) 105, as will be described in greater detail below. It should be understood that while software modules 130 and/or PPV value normalization application 150 can be embodied in any number of computer executable formats, in certain implementations software modules 130 and/or PPV normalization application 150 comprise one or more applications that are configured to be executed at computing device(s) 105 in conjunction with one or more applications or 'apps' executing at remote devices, such as user computing device(s) 145 and/or one or more viewers such as internet browsers and/or proprietary applications.

Furthermore, in certain implementations, software modules 130 and/or PPV normalization application 150 can be configured to execute at the request or selection of one or more user computing devices 145 (or any other such user having the ability to execute a program in relation to computing device(s) 105, such as a network administrator), while in other implementations computing device(s) 105 can be configured to automatically execute software modules 130 and/or PPV normalization application 150, without requiring an affirmative request to execute. It should also be noted that while FIG. 1 depicts memory 120 oriented on circuit board 110, in an alternate arrangement, memory 120 can be operatively connected to the circuit board 110. In addition, it should be noted that other information and/or data relevant to the operation of the present systems and methods (such as database 155) can also be stored on storage 125, as will be discussed in greater detail below.

With continued reference to FIG. 1, one or more databases 155 are also preferably stored on storage 125. As will be described in greater detail below, database(s) 155 can contain and/or maintain various data items and elements that are utilized throughout the various operations of inter-sport fantasy sports challenge system 100, including but not limited to, draft notifications, score notifications, and the like. It should be noted that although database(s) 155 is depicted as being configured locally to computing device(s) 105, in certain implementations database(s) 155 and/or various of the data elements stored therein can be located remotely (such as on a remote device or server—not shown) and connected to computing device 105 through Network/Internet 135, in a manner known to those having ordinary skill in the art.

As referenced above, it should be noted that in certain implementations, such as the one depicted in FIG. 1, one or more user computing devices 145 can be in periodic or ongoing communication with computing device(s) 105 thorough a computer network such as the Internet 135. Though not shown, it should be understood that in certain other implementations, user computing device(s) 145 can be in periodic or ongoing direct communication with computing device 105, such as through communications interface 140. It should also be understood that in certain implementations, such as the one depicted in FIG. 1, various user computing devices 145 can be in periodic or ongoing communication with one another through a computer network such as the Internet 135.

Communication interface(s) 140 are also operatively connected to circuit board(s) 110. Communication interface(s) 140 can be any interface that enables communication between the computing device(s) 105 and external devices, machines and/or elements. Preferably, communication interface(s) 140 include, but are not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device(s) 105 to other computing devices and/or communication networks such as private networks and the Internet 135. Such connections can include a wired connection or a wireless connection (e.g. using the IEEE 802.11 standard), though it should be understood that communication interface(s) 140 can be practically any interface that enables communication to/from the circuit board 110.

Thus, illustrative embodiments and arrangements of the present systems and methods provide a computer implemented method, computer system, and computer program product for providing inter-sport fantasy sports challenges. The flowcharts and block diagrams in FIGS. 2-4, and 6 illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The operation of the inter-sport fantasy sports challenge system 100 and the various elements and components described above will be further appreciated with reference to a method for providing an inter-sport fantasy sports challenge as described below, with reference to FIGS. 2-6.

Figure 2:
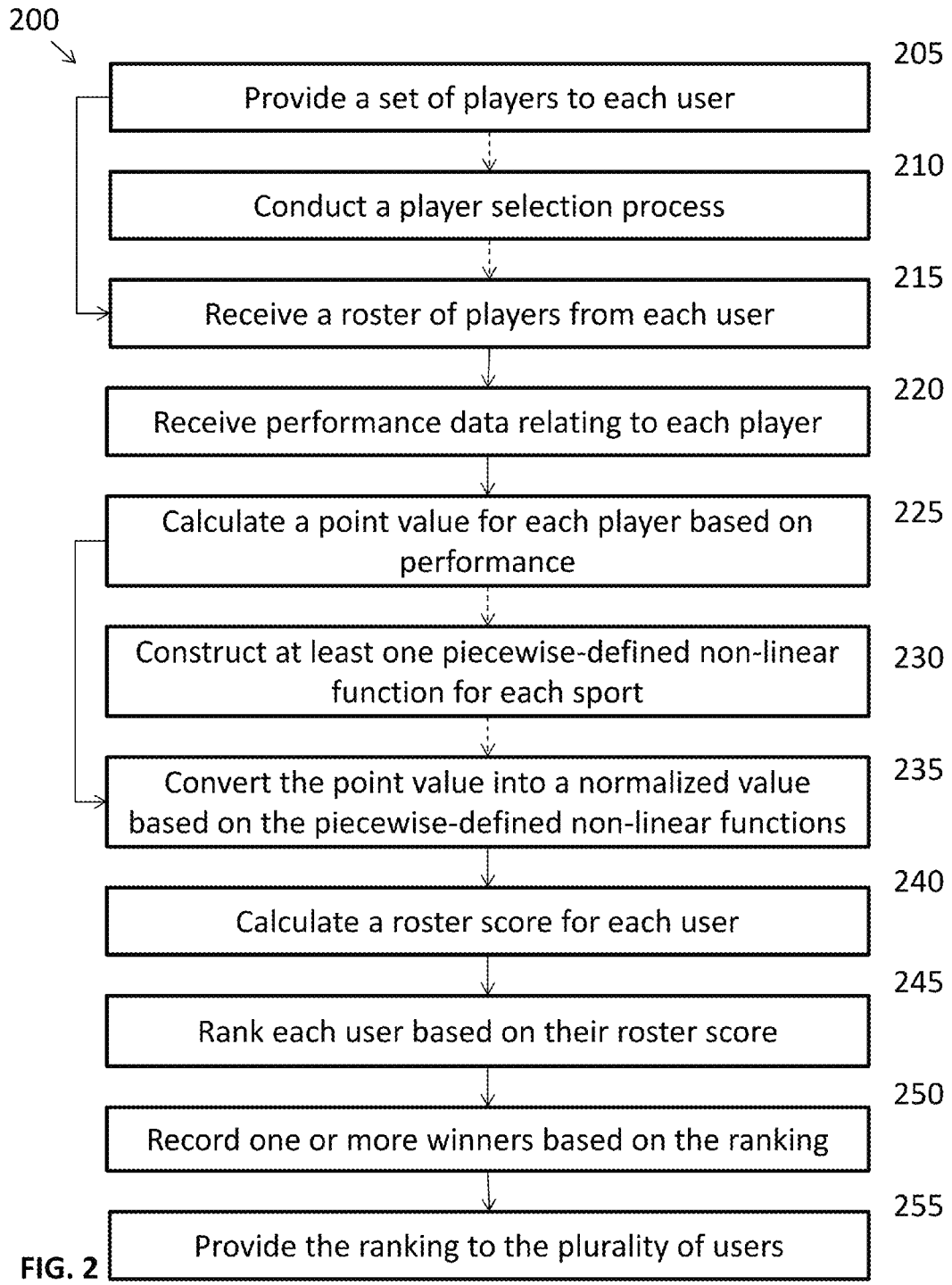
FIG. 2 is a flow diagram illustrating a method of providing an inter-sport fantasy sports challenge in accordance with one or more embodiments of the present application.

FIG. 2 shows a flow diagram of routine 200, which illustrates a broad aspect of a method for providing an inter-sport fantasy sports challenge. It should be appreciated that several of the logical operations described herein are implemented (1) as a sequence of computer implemented acts or program modules running on inter-sport fantasy sports challenge system 100, and/or (2) as interconnected machine logic circuits or circuit modules within the system 100. The implementation is a matter of choice dependent on the requirements of the device (e.g., size, energy, consumption, performance, etc.). Accordingly, the logical operations described herein are referred to variously as operations, steps, structural devices, acts, or modules. As referenced above, several of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 3:
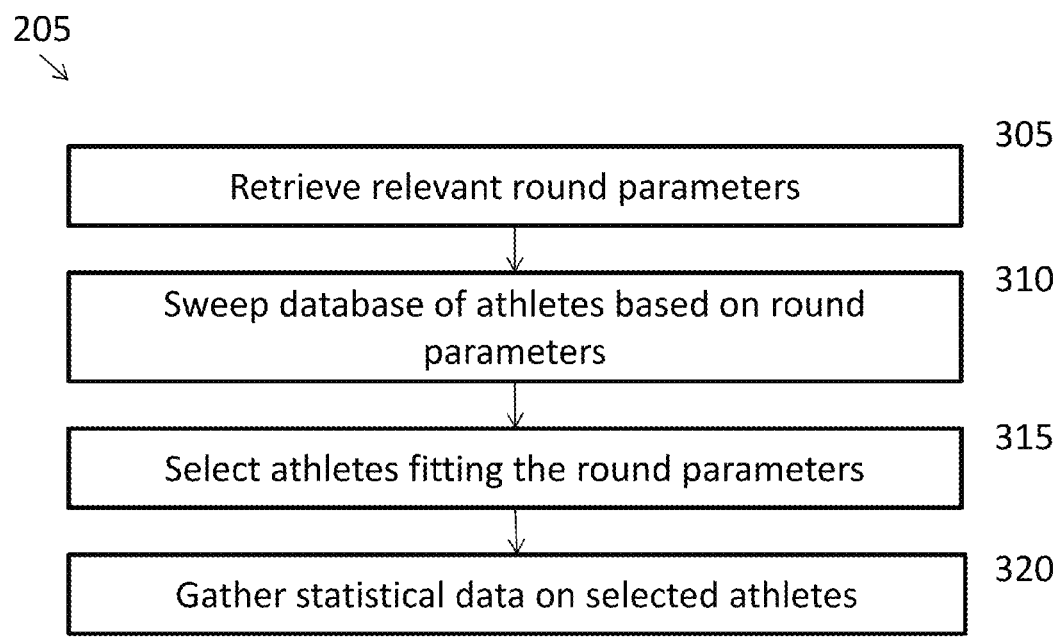
FIG. 3 is a flow diagram showing a routine in furtherance of providing an inter-sport fantasy sports challenge in accordance with at least one embodiment of the present application.

The process begins at step 205, where the processor 110 executing one or more software modules 130 configures computing device(s) 105 to provide a set of available players to one or more users 145. The set of available players can be determined in several ways. A preferred implementation of step 205 is shown in FIG. 3. First, in reference to FIG. 3, at step 305 the processor 110 executing one or more software modules 130, configures the computing device 105 to retrieve relevant parameter(s) for the current round ("round parameter(s)") of the inter-sport fantasy sports challenge. In one or more embodiments, the round parameters can be determined by one or more users 145 who will be participating in that particular round of the inter-sport fantasy sports challenge. In at least one embodiment, the round parameters can be determined by a system administrator. These round parameters can include, but are not limited to: the period of time that the current fantasy sports challenge will be conducted (e.g., a day, a week, a month, a period equivalent to the length of a season for one or more sports leagues), the particular sports the set of athletes will be chosen from and/or the particular leagues (e.g., professional leagues, NCAA) from which the set of athletes will be chosen from. For example, a particular fantasy sports challenge can be for one month (e.g., December), and included athletes from the National Basketball Association (NBA), The National Hockey League (NHL), and the National Football League (NFL).

Continuing with FIG. 3, at step 310 the processor 110 executing one or more software modules 130, configures the computing device 105 to sweep the database(s) 155 for relevant athletes based on the round parameters. For instance, continuing with the example above, the database would be swept for athletes who are participating and/or are eligible to participate in games in the NBA, NHL, and NFL during the month of December. Once the eligible athletes are identified based on the round parameters, the eligible athletes are then selected for inclusion in the set of available players at step 315. In at least one embodiment, once the eligible athletes have been selected, the processor 110 executing one or more software modules 130, configures the computing device 105 to gather statistical data on the selected athletes (step 320). In certain implementations, the statistical data for each eligible athlete can be used by the participating user(s) to select athletes for their rosters via a player selection process, as will be explained in further detail below. In certain embodiments, the statistical data for the selected athletes can be gathered from the one or more databases 155. In at least one embodiment, the statistical data can be gathered from another computing device and/or system.

Referring back to FIG. 2, optionally at step 210 the processor 110 executing one or more software modules 130, configures the computing device 105 to conduct a player selection process for the participating user(s) in the inter-sport fantasy sports challenge round. In one or more implementations, the player selections can be made by the participating user(s) using one or more other computing devices. In at least one embodiment, the player selection process can be conducted in real time. A preferred embodiment of the player selection process 210 is shown at FIG. 4.

Figure 4:
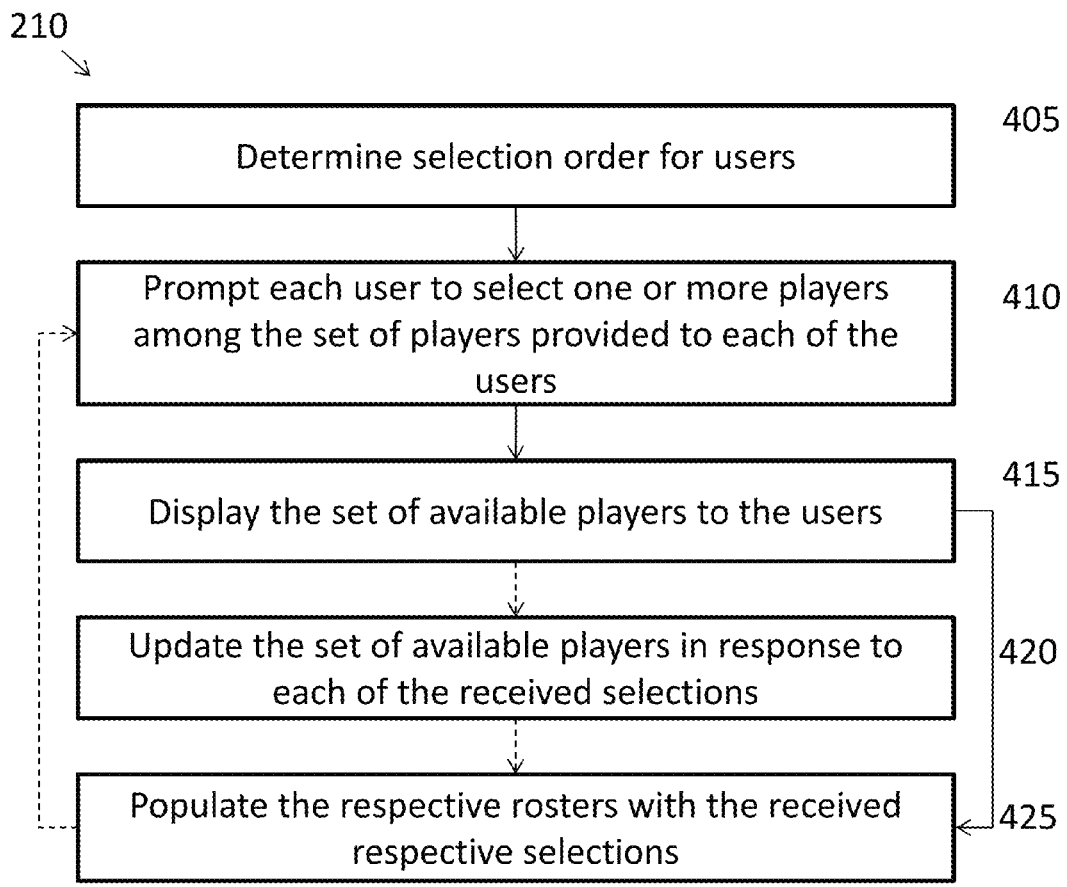
FIG. 4 is a flow diagram showing a routine in furtherance of providing an inter-sport fantasy sports challenge in accordance with at least one embodiment of the present application.

Referring to FIG. 4, as part of an exemplary player selection process (commonly referred to as a "draft"), at step 405 the processor 110 executing one or more software modules 130, can configure the computing device 105 to determine a selection order or drafting order for the participating users in the inter-sport fantasy sports challenge. In one or more implementations, the software components (e.g., module(s) 130) for the player selection process can be implemented using programming languages such as Ruby and/or JavaScript. In at least one embodiment, a drafting order is determined such that the participating users take turns selecting players for their roster based a predetermined order. In one or more implementations, the drafting order can be what is commonly referred to as an "S-curve" (or "snaking" or "snake order") such that the selection order for the first round of player selections is then reversed for the second round of players selections, and then reversed back to the original order for the third round of player selections, and so on until each participating user's roster is filled. In a single-user embodiment in which a participating user is not competing against a select group of other users, a drafting order need not be determined.

In at least one embodiment, the player selection process can be done on an individual basis for each user (e.g., asynchronously). For example, in at least one implementation, each user would have a predetermined amount of "funds" ("salary cap") stored in relation to a respective user profile or otherwise stored in a manner that can be accessed by the processor for the user to use in connection with the selection of players for their rosters, where each athlete eligible for selection would have a "salary." Each athlete's salary can be predetermined in any number of ways, including but not limited to past performance during one or more event intervals, and/or future projections. In this implementation, each user can be required to fill all slots of his or her roster, and the combined salaries of the selected players can be tested to ensure that the sum of the combined salaries of the selected players does not exceed a prescribed salary cap using code executing in the processor, in which the prescribed salary cap can be set for the particular challenge by the participating users and/or the system administrator, for example. Thus, in this implementation, users select their rosters independently of one another, and do not have to select players at the same time, thus a drafting order need not be determined.

With continuing reference to FIG. 4, at step 410 the processor 110 executing one or more software modules 130, can configure the computing device 105 to prompt each participating user to select one or more players among the set of available players provided to each of the user. In one or more implementations in which the player selection process (or "draft") is completed in real-time, participating users are prompted (e.g., via their computing devices) when it is their turn to select a player from the set of available players. Following a prompt, the prompted user is given a predetermined period of time (e.g., one minute) in which to select a player for that round of the draft. Once the prompted user has selected a player, the next user in the drafting order is prompted to make a player selection within an equivalent predetermined period of time. In one or more implementations, if a user does not make a player selection within the predetermined period of time, the processor 110 executing one or more software modules 130, can configure the computing device 105 to make a player selection for the user.

In a preferred embodiment, the players selected for each roster can be selected without regard to the particular sport and/or the particular position the player plays. In other words, users have the ability to choose players regardless of the sport they play, the position they play, and the position and sport played by other players already selected for their rosters. In certain instances, however, only players from a select number of sports and/or leagues may be available for selection due to the time parameters set for the particular inter-sport fantasy sports challenge. For example, if the time period chosen for a particular inter-sport fantasy sports challenge is the month of December, then Major League Baseball (MLB) players would not eligible for selection, as no MLB games are played during December. Similarly, if the time period chosen for a particular inter-sport fantasy sports challenge is two weeks in the month of July, MLB players would be eligible for selection, but NBA and NHL players would not be eligible, as generally there are no NBA or NHL games played during the month of July. As mentioned above, in a preferred embodiment there is no restriction on the number of players selected for a particular roster in terms of their position in a particular sport. For example, a user could select Tom Brady, Peyton Manning, and Aaron Rodgers for his or her roster despite the fact that they are all quarterbacks in the NFL. Likewise, in a preferred embodiment, a participating user does not have to select a quarterback at all (or any NFL football player for that matter), provided there are enough athletes from other sports eligible for selection (based on the round parameters) such that the participating user can fill his or her roster.

In an alternative embodiment, the rosters from each respective user can include a prescribed number of players having prescribed positions, and the respective rosters as between at least two of the users includes players from two or more of the plurality of the different sports.

Continuing with FIG. 4, at step 415, the processor 110 executing one or more software modules 130, can configure the computing device 105 to display the set of available players to the participating users via their computing devices. Optionally, at step 420, the processor 110 executing one or more software modules 130, configures the computing device 105 to update the set of available players in response to each of the received player selections. More specifically, in embodiments in which competing users cannot select any of the same players for their respective rosters during the draft, when a participating user is prompted to make a player selection, he can only view an updated set of available players that have not already been selected. Alternatively, the set of available players can remain static for the entire player selection process, and a selecting user can receive an error message if he or she attempts to select a player who has already been selected.

Continuing with FIG. 4, at step 425, the processor 110 executing one or more software modules 130, can configure the computing device 105 to populate the respective users' rosters with the received respective player selections. The users' rosters can be populated continuously as the players are selected (as shown by the arrow from step 425 back to step 410), or alternatively, at the end of the player selection process.

Referring again to FIG. 2, at step 215 the processor 110 executing one or more software modules 130, can configure the computing device 105 to receive a roster of players from each participating user. The size of the roster (number of players on each roster) can vary based on the specific rules and/or parameters of the particular inter-sport fantasy sports challenge. In one or more implementations, the size of the roster can be designated by one or more participating users 145 via their computing devices prior to commencement (via the processor 110) of the inter-sport fantasy sports challenge. Alternatively, a system administrator (via computing device(s) 105 for example) can determine the size of the roster for the particular inter-sport fantasy sports challenge. As mentioned above, in a preferred embodiment, the players selected for each roster can be selected without regard to the particular sport and/or the particular position the player plays, provided the players are eligible for selection based on the round parameters (e.g., total time period of the challenge).

In an alternative embodiment, the rosters from each respective user include a prescribed number of players having prescribed positions, and the respective rosters as between at least two of the users includes players from two or more of the plurality of the different sports. Thus, in this alternative embodiment, the players selected for each roster are selected to fill a prescribed position. In certain implementations, the number and type(s) of positions required for each roster can be determined prior to commencement of the challenge by one or more participating users or a system administrator.

Continuing with FIG. 2, at step 220, the processor 110 executing one or more software modules 130, can configure the computing device 105 to receive performance data relating to each selection-eligible player during an event interval. In one or more implementations, the software components (e.g., module(s) 130) for receiving the player performance data can be implemented using programming languages such as Ruby and/or JavaScript. In one or more implementations, the event interval can be a portion of the total time period of the particular challenge (a prescribed period of time), or the total time period the particular challenge. In a preferred implementation, the event interval is one day and the total time period of the challenge is one day (i.e., a daily challenge). More particularly, in this implementation, a user selects one roster per draft that is valid only for games that occur on a particular day (event interval), which is also the total length of the particular challenge. Thus, performance data for each player is only collected for that particular day. In this implementation, if the user wants to have a "rematch" with one or more of the same users from the challenge, new rosters are selected for each user.

In another implementation, for example, the total time period of a challenge can be three months and the event interval can be one week, such that performance data relating to each player is received on a weekly basis for three months. In this example, a user could face off with a different participating user every week, and the user's ranking in the challenge would be based on the performance data of the user's players relative to his or her opponent's players each week. Alternatively, in an example implementation in which the total time period of the challenge is a week, the event interval can also be a week, such that the performance data relating to each player is only received one time during the entire challenge (i.e., at the end of the week). In at least one implementation, an event interval can be a prescribed number of sporting events (games). In one or more implementations, an event interval can also be both a prescribed period of time and a prescribed number of sporting events.

With continued reference to FIG. 2, at step 225 the processor 110 executing one or more software modules 130, can configure the computing device 105 to calculate a point value for each player ("player point value") based on the received performance data for the event interval. In at least one implementation, the player point value for each player is calculated via at least one standard fantasy sports scoring methodology for the sport in which each player participates as is known by persons having ordinary skill in the art. For example, in at least one implementation, the scoring methodology for the player point value for a basketball player is the sum of point values given for each statistical category (e.g., points, rebounds, assists, blocks, steals, turnovers) filled by the basketball player. For instance, in one or more implementations, each point scored is worth 1 point, each made 3-point shot is worth 0.5 points, each rebound is worth 1.25 points, each assist is worth 1.5 points, each block is worth 2 points, each steal is worth 2 points, and each turnover is worth –0.5 points. Thus, in this implementation, a basketball player's player point value would equal the sum of the point values received in each statistical category for the particular event interval. For instance, if the event interval is one game, and in the one game, basketball player "A" has 10 points, 0 made 3-point shots, 4 rebounds, 4 assists, 2 blocks, 1 steal, and 2 turnovers, then the player point value for "A" would be 26 points when the fantasy point scoring methodology is as set forth above. In at least one implementation, the calculation of the player point value can also include one or more adjustments, such as input-point bonuses for very rare performance results (e.g., a basketball player recording triple-double, a baseball player hitting for the cycle). The scoring methodology for each sport and/or position included in a particular challenge can be prescribed and uniformly applied throughout the length of the challenge. In at least one implementation, the scoring methodology for each sport and/or position can be prescribed and uniformly applied throughout all challenges.

Optionally, at step 230 the processor 110 executing one or more software modules 130, can configure the computing device 105 to construct in the memory 120 and/or storage 125 at least one piecewise-defined non-linear function for each sport.

Figure 5:
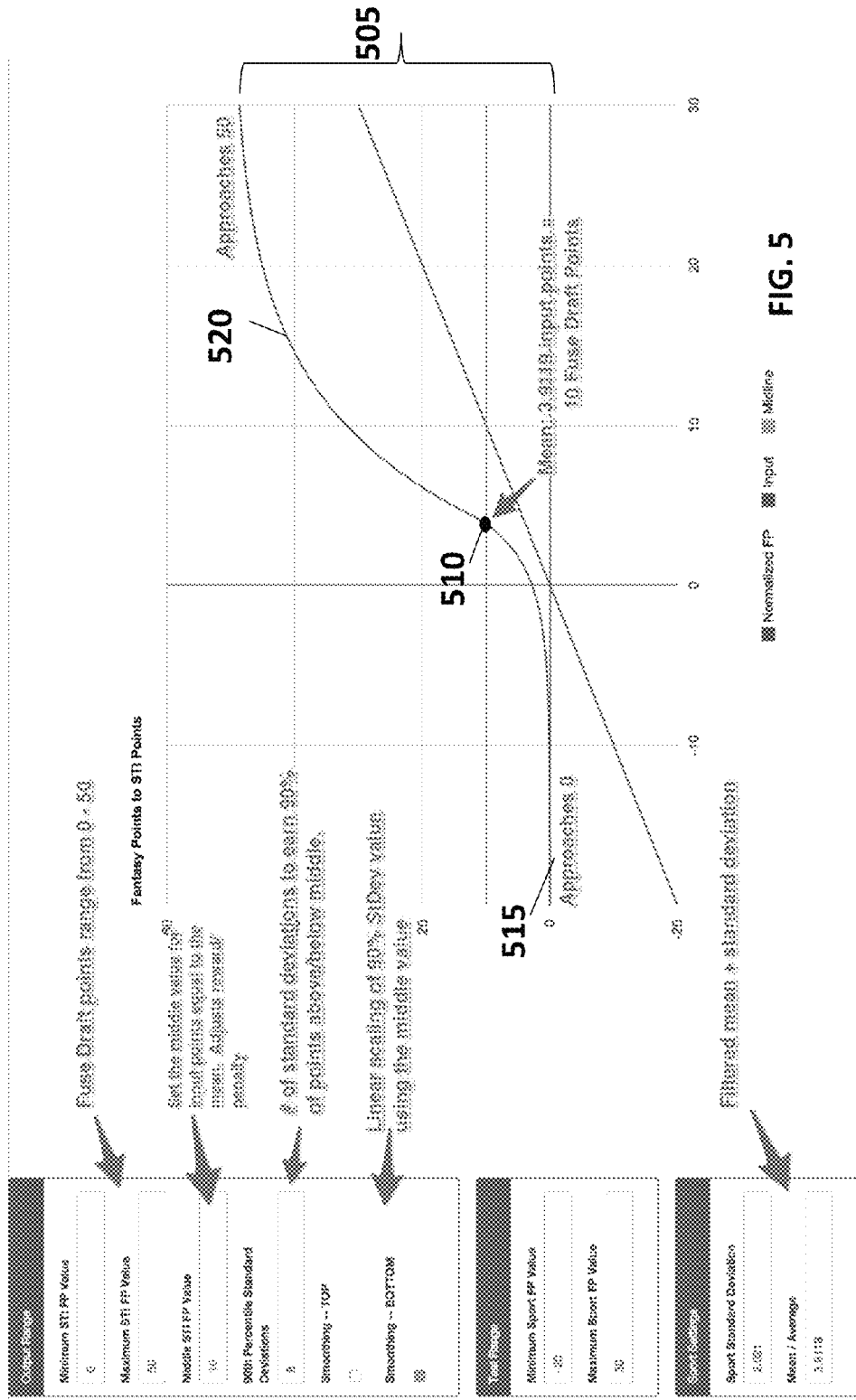
FIG. 5 is a graphical representation of a piecewise-defined non-linear function for the determination of normalized point values in accordance with one or more embodiments of the present application.

A more complete understanding of the piecewise-defined non-linear function(s) can be attained with reference to FIG. 5. In a preferred embodiment, the one or more piecewise-defined non-linear functions for each sport are continuous functions, as exemplified by the curve 505. Further, in a preferred embodiment, the domain (x-values) of the piecewise-defined non-linear function is the player point value scale of the standard fantasy point scoring methodology for the particular sport. Additionally, the range (y-values) of the piecewise-defined non-linear function can be a common point value scale (normalized value scale) and can have a minimum normalized value and a maximum normalized value. The normalized value scale can have a minimum and maximum value such that when a player point value is converted to a normalized value, there is a maximum normalized value (maximum normalized score) and a minimum normalized value (minimum normalized score). In the example in FIG. 5, the maximum normalized value is set to 50 and the minimum normalized value is set to 0. As such, in this example, a player's score, once converted to the normalized value scale, cannot exceed 50 and cannot be less 0.

With continued reference to FIG. 5, the piecewise-defined non-linear function for a particular sport can also comprise a transition value, such that the transition value is a mean of player point values for a plurality of players of the particular sport. The player point value that is equal to the mean is then assigned a pre-defined normalized value on the common point value scale (the "center value"). For example, as shown in FIG. 5, the transition value of the example curve is 3.9119, which is the mean of the player point values for a plurality of players of the particular sport. The transition value is then assigned a center value of "10" which is the pre-defined normalized value on the common point value scale in this example. Thus, in this example, the middle point 510 on the curve comprises a transition value (x-value) of 3.9119, and a center value (y-value) of 10.

Continuing with FIG. 5, in a preferred embodiment, the piecewise-defined non-linear function can comprise: 1) a first function 515 that is applied to convert a calculated player point value to the normalized value when the calculated player point value is less than the mean player point value; and 2) a second function 520 that is applied to convert the calculated player point value to the normalized value when the calculated player point value is greater than the mean player point value. In other words, if the calculated player point value for a particular player is less than the mean player point values for a plurality of players of that player's particular sport (and/or position), then the first function 515 is used convert the calculated player point value to its corresponding normalized value. In contrast, if the calculated player point value for a particular player is greater than the mean player point values for a plurality of players of that player's particular sport (and/or position), then the second function 520 is used convert the calculated player point value to its corresponding normalized value. In one or more implementations the plurality of players from a particular sport used to calculate the mean player point value can comprise players of all positions for that particular sport. For example, in at least one implementation, guards, forwards, and centers in a basketball league (e.g., NBA) can all be included in the plurality of players used to calculate the mean player point value. Alternatively, in at least one implementation, the plurality of players from a particular sport used to calculate the mean player point value for a particular piecewise-defined non-linear function can consist only of players of the same position as the player whose player point value is being converted. For instance, in this implementation, if the player point value for an NFL running back is being converted to a normalized value, the plurality of players used to calculate the mean player point value can consist only of other NFL running backs.

In one or more implementations, the first function 515 of the piecewise-defined non-linear function can define a non-linear rate at which normalized points are subtracted from the center value to obtain the converted normalized value for a player point value that is less than the mean player point value. Likewise, in one or more implementations, the second function 520 of the piecewise-defined non-linear function can define a non-linear rate at which normalized points are added to the center value to obtain the converted normalized value for a player point value that is greater than the mean player point value. In at least one implementation, the non-linear rate for the first and second functions can be functions of a prescribed number of standard deviations below and above the mean player point value for the particular sport, respectively, that are required to award a prescribed percentage of normalized points below and above the center point, respectively.

Figure 6:
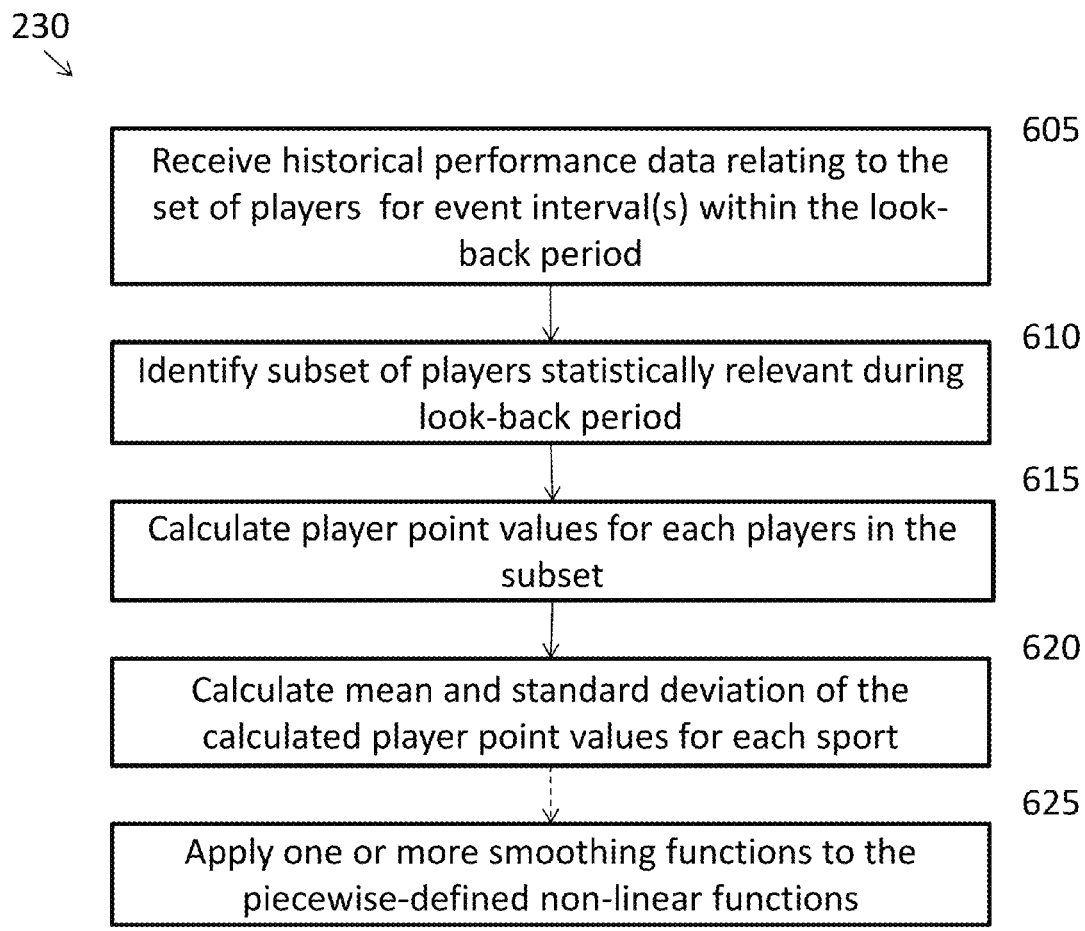
FIG. 6 is a flow diagram showing a routine in furtherance of providing an inter-sport fantasy sports challenge in accordance with at least one embodiment of the present application.

As stated above, at step 230 (FIG. 2) the processor 110 executing one or more software modules 130, can configure the computing device 105 to construct in the memory 120 and/or storage 125 at least one piecewise-defined non-linear function for each sport. A preferred embodiment of step 230 is shown at FIG. 6. With reference to FIG. 6, at step 605, the processor 110 executing one or more software modules 130 can configure the computing device 105 to receive historical performance data relating to the set of players for event interval(s) within a look-back period. The historical performance data can be used to calculate the mean player point values for use in constructing the piecewise-defined non-linear function for each sport. The historical performance data can be limited in scope based on one or more event intervals within a predefined look-back period. For example, the event interval could be one game, and the look-back period could be a particular month, such that the historical performance data would be received for the set of players for each game (or a select number of games) over that particular one-month look-back period. Thus, in certain implementations, the look-back period can comprise one or more of a prescribed time period and a prescribed number of sporting events. In one or more implementations, the set of players can be any player who was eligible to play during the look-back period. In at least one implementation, the set of players can be further limited to those players who played the sport and/or position for which the piecewise-defined non-linear function is being constructed.

In one or more implementations, the event interval and/or the look-back period for the historical performance data can be determined by one or more participating users 145 at the start of the particular inter-sport fantasy sports challenge. In at least one implementation, the event interval and/or the look-back period for the historical performance data can be determined by a system administrator using computing device(s) 105, for example, at the start of the particular inter-sport fantasy sports challenge.

With continued reference to FIG. 6, at step 610, the processor 110 executing one or more software modules 130 can configure the computing device 105 to identify a subset of players within the set of players used for the historical performance data. In one or more implementations, this subset of players includes player(s) that play the particular sport and/or the particular position that the piecewise-defined non-linear function is constructed for, and the subset of player(s) are "statistically relevant" during one or more specified event intervals of a pre-defined look-back period. For example, in at least one implementation, the set of players could include goalies in the NHL; however, only the NHL goalies that were "statistically relevant" during the look-back period would be included in the subset. For instance, NHL goalies that are considered "statistically relevant" during the look-back period can be those that played in one or more games during the look-back period. Any number of parameters could be used to determine which players are considered "statistically relevant" during the look-back period, including but not limited to a specified number of minutes played in games during one or more event intervals of the look-back period, or a specified number of games played during one or more event intervals of the look-back period.

Continuing with FIG. 6, at step 615, the processor 110 executing one or more software modules 130, can configure the computing device 105 to calculate player point values for the historical performance data of each of the players in the subset identified in step 610 for the one or more event intervals in the look-back period. In at least one embodiment, the player point values can be calculated by applying one or more standard fantasy scoring methodologies for the particular sport and/or the particular position of the players in the subset to the received historical performance data for that subset. At step 620, the processor 110 executing one or more software modules 130, can configure the computing device 105 to calculate the mean of the calculated player point values of step 615. In one or more embodiments, at step 620 the processor 110 executing one or more software modules 130, can also configure the computing device 105 to calculate a standard deviation of the calculated player point values of step 615 and then calculate the mean of the player point values that factors in the standard deviation. In one or more implementations, the software components (e.g., module(s) 130) for calculating the mean player point values and/or standard deviations can be implemented using SQL and/or PLSQL.

In one or more implementations, the mean and/or standard deviation values can remain static ("frozen") over multiple event intervals, throughout an entire challenge, and/or for multiple challenges. The freezing of the mean and/or standard deviation values can ensure that scoring remains "predictable" and does not change from one time interval to the next for two players from the same sport and/or position who perform exactly equally, but at different times. For example, assume players A and B play the same position in the same sport. If player A has a player point value of 9 in a first event interval, and player B has a player point value of 9 in a second event interval, freezing the mean and standard deviation over both the first and second intervals ensures that player A and player B receive the same normalized value (score) for their identical performances.

In one or more implementations the mean of the calculated player point values and/or the standard deviation can be calculated after first excluding the calculated player point values that are statistical outliers. In other words, a designated amount (e.g., percentage, number) of the highest player point values during the look-back period and a designated amount (e.g., percentage, number) of the lowest player point values during the look-back period can be excluded from the calculations of the mean player point value and/or the standard deviation for the piecewise-defined non-linear function for a particular sport and/or position. For example, the top 10% of player point values and the lowest 15% of player point values received from the historical performance data of the subset of players can be excluded from the calculation of the mean player point value and standard deviation. This exclusion of a certain percentage of the highest and lowest player point values allows for the calculation of a mean player point value (and standard deviation) that is free of abnormally high values (e.g., the very best player performances) and abnormally low values (e.g., the very worst player performances). As such, these outlying player performances (good and bad) do not skew the mean player point value (and standard deviation) over the look-back period. The mean player point value equals the transition value (as discussed above in reference to FIG. 5), which is then assigned a pre-defined normalized value on the common point value scale (center value).

Via the steps set forth in FIG. 6, the processor 110 is configured to construct the piecewise-defined linear function for a particular sport and/or a particular position. In one or more implementations, the piecewise-defined linear function for a particular sport and/or a particular position can be represented by the following equations:

$$\text{for } x > \mu: y = a(1 - c1^{((x-\mu)/\sigma)}) + b \quad \quad 1)$$

$$\text{for } x = \mu: y = b \quad \quad 2)$$

$$\text{for } x < \mu: y = d(-1 + c2^{((\mu-x)/\sigma)}) + b \quad \quad 3)$$

wherein "x" is the calculated player point value during an event interval of the challenge, "y" is the normalized value on the common point value scale, "$\mu$" is the calculated mean player point value of the subset of players using the historical performance data of the look-back period, "$\sigma$" is the calculated standard deviation of the player point values of the look-back period, and wherein "c1" is a constant that is a function of the prescribed number of desired standard deviations above the mean and wherein "c2" is a constant that is a function of the prescribed number of desired standard deviations below the mean. Further, "a" is equal to the maximum normalized value minus the center value, which is the number of points that can be earned above the center value; "b" is the center value; and "d" is equal to the center value minus the minimum normalized value, which is the number of points that can be lost below the center value.

A more thorough understanding of the above equations can be gleaned by reference to FIG. 5. As shown in FIG. 5, the minimum normalized value is 0 and the maximum normalized value is 50. In other words, in this example, when the player point value for a particular athlete for a particular event interval is converted to a normalized value using the piecewise-defined linear function, the normalized value or score for the athlete for the particular event interval ranges from 0 (minimum) to 50 (maximum).

As further shown in FIG. 5, the calculated mean player point value for the subset of athletes (using the historical performance data) is 3.9119. This mean has a corresponding normalized value (center value) of 10. Thus, in this example, if an athlete's player point value (x) for an event interval during the challenge equals the mean player point value of the historical performance data ($\mu$), then the normalized value for that athlete (y) is equal to the center value (b), which is 10, as shown by equation (2) above. Continuing with this example, if an athlete's player point value (x) is greater than the mean player point value of the historical performance data ($\mu$), then the normalized value for that athlete (y) is determined by using equation (1) above. In FIG. 5, equation (1) corresponds to the portion of the curve that is above the center value, 10, on the y-axis (second function 520).

If an athlete's player point value (x) is less than the mean player point value of the historical performance data ($\mu$), then the normalized value for that athlete (y) is determined by using equation (3) above. In FIG. 5, equation (3) corresponds to the portion of the curve that is below the center value, 10, on the y-axis (first function 515).

Referring back to FIG. 6, in at least one implementation, at step 625 the processor 110 executing one or more software modules 130, can configure the computing device 105 to apply at least one smoothing function to the piecewise-defined non-linear functions.

In a preferred implementation, smoothing is accomplished by adjusting the c1 and/or c2 values in the above equation. More particularly, because c1 and c2 are a function of the desired standard deviation (dsd) for above and below the mean value, respectively, the smoothing is a linear scale on the desired standard deviation value for the respective sections of the curve. In one or more implementations, the dsd is 8. To calculate dsd with smoothing for the portion of the curve above the mean (i.e., "$dsd_1$"), the following equation is used: $dsd_1 = dsd*2*(\text{maximum value} - \text{center value})/(\text{maximum value} - \text{minimum value})$. To calculate dsd with smoothing for the portion of the curve below the mean (i.e., "$dsd_2$"), the following equation is used: $dsd_2 = dsd*2*(\text{center value} - \text{minimum value})/(\text{maximum value} - \text{minimum value})$. For example, in FIG. 5, the desired standard deviation (dsd) for the top and bottom of the curve is 8 and a smoothing function is applied to the bottom portion of the curve (first function 515). Thus, the $dsd_2 = 8*2*(10-0)/(50-0) = 3.2$. Thus the final desired standard deviation values ($dsd_n$) for the curve of FIG. 5 are 8 for the top portion of the curve (i.e., $dsd_1$) and 3.2 for the bottom portion of the curve (i.e., $dsd_2$). The $dsd_1$ equals dsd (i.e., 8) in this example because no smoothing function was applied to the top portion of the curve.

Using the dsd calculations, c1 and c2 (in general, $c_n$) can then be calculated. In a preferred implementation, $c_n = (1-p)^{(1/dsd_n)}$, where p equals the prescribed percent of points above/below the center value. In one or more implementations, p is less than 100% and preferably is 90%. As shown in FIG. 5, the prescribed percent of point above/below the center value is 90% (i.e., 0.9). In other words, in the example of FIG. 5, for the top portion of the curve, 8 ($dsd_1$) is the number of standard deviations to earn 90% of points above the center value. For the bottom portion of the curve (after accounting for the smoothing function), 3.2 ($dsd_2$) is the number of standard deviations to lose 90% of points below the mean. Thus, for this example, $c1 = (1-0.9)^{(1/8)} = 0.74989$, and $c2 = (1-0.9)^{(1/3.2)} = 0.48697$.

As explained above in reference to the example in FIG. 5, in a preferred implementation, one or more smoothing functions can be applied to the piecewise-defined non-linear functions such that at least one of the smoothing functions modifies the slope of the piecewise-defined non-linear functions for a prescribed range of calculated player point values that falls below the mean player point value of the historical performance data ($\mu$) (i.e., transition value). The smoothing function as applied to a prescribed range of calculated player point values that fall below $\mu$ removes the sharp change in the slope of the curve near the $\mu$ value, but results in a more pronounced decline in corresponding normalized values (scores) for player point values less than $\mu$ as compared with a piecewise function without the smoothing function. However, it should be understood that the piecewise-defined non-linear functions are continuous regardless of whether 1 or more smoothing functions are applied.

Referring again to the example of FIG. 5, a smoothing function is applied to the portion of the curve that is below the center value, which corresponds to the prescribed range of calculated player point values below the mean value (μ)/transition value (3.9119). As shown, this portion of the curve (first function 515) has a slope that is less steep than the portion of the curve that is above the center value. Thus, in this example, if an athlete's performance during an event interval results in a player point value slightly less than the mean value of 3.9119, then the normalized value (score) for that athlete is only slight less than the center value, 10. However, as the athlete's player point value continues to decrease below the mean, the smoothing function "punishes" the user, as there are fewer standard deviations (3.2) required to lose 90% of the points below the center than there are standard deviations (8) required to gain 90% of the points above the center. Again, it should be noted that even when one or more smoothing functions are applied, the piecewise-defined non-linear function remains continuous. In contrast, if an athlete's performance during an event interval results in a player point value slight greater than the mean value of 3.9119, the increased slope of the top portion of the curve results in a corresponding normalized value (score) that will be further away (incrementally greater) than the center value relative to normalized value for the slight below average player point value. As such, players whose player point value is greater than the mean value (μ) are "rewarded" with an incrementally greater normalized score.

Figure 7:
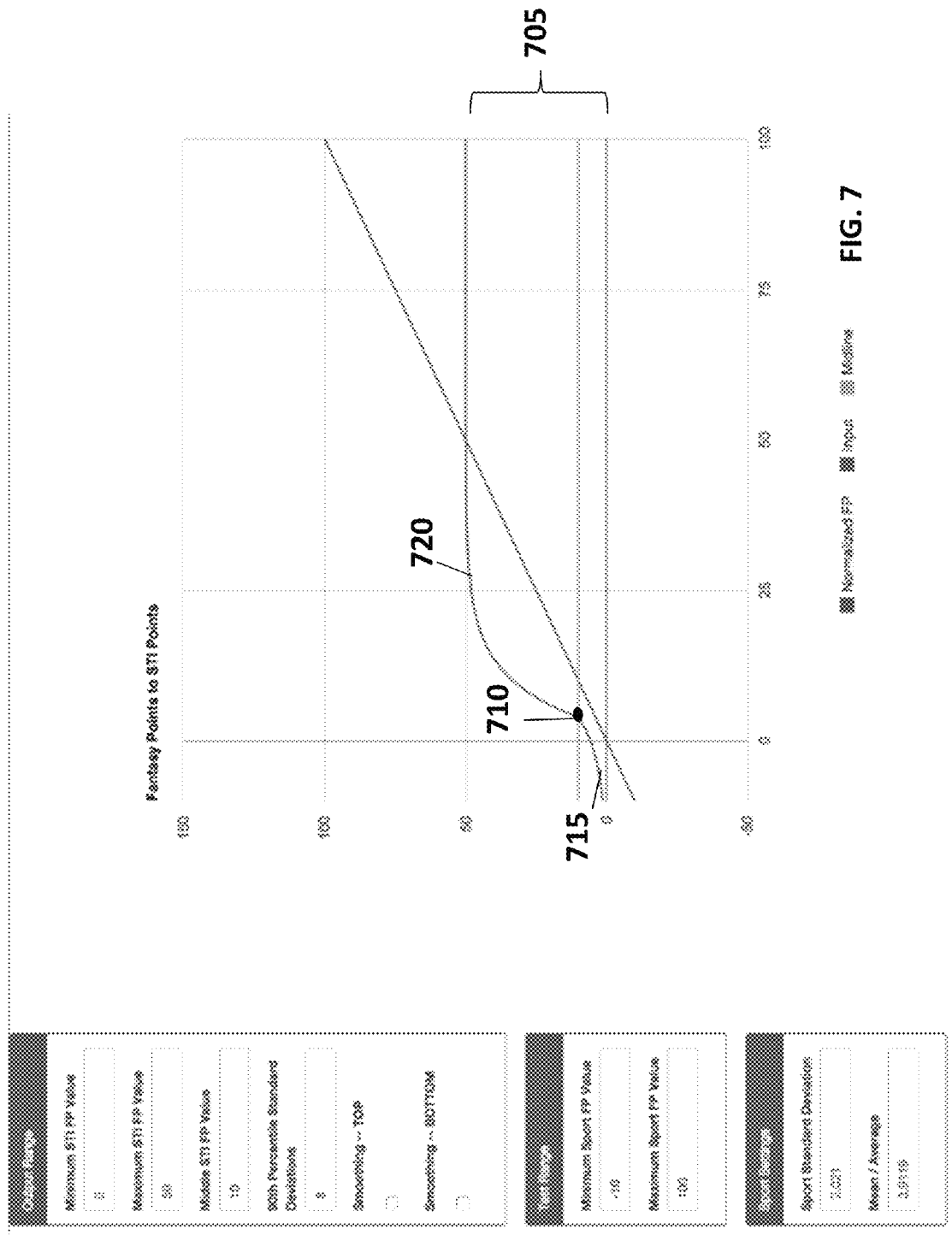
FIG. 7 is a graphical representation of an alternative piecewise-defined non-linear function for the determination of normalized point values in accordance with one or more embodiments of the present application.

FIG. 7 shows an alternative piecewise-defined non-linear function in accordance with at least one implementation. Here, the curve 705 again represents a continuous function including a middle point 710. In this implementation, however, no smoothing function is applied to either the bottom portion (first function 715) of the curve 705 or the top portion (second function 720).

FIG. 8 shows another alternative piecewise-defined non-linear function in accordance with at least one implementation. The continuous function is represented by curve 805 with middle point 810. Here, no smoothing function is applied to the bottom portion (first function 815) of the curve 805; however a smoothing function is applied to the top portion (second function 820). Thus, in this example, an athlete's corresponding normalized value increases less rapidly for player point values as they rise above the mean μ, as compared with a top portion of the curve in which a smoothing function was not applied.

FIG. 9 shows yet another alternative piecewise-defined non-linear function in accordance with at least one implementation. The continuous function is represented by curve 905 with middle point 910. In this example, a smoothing function is applied to both the bottom portion (first function 915) of the curve 905 and the top portion (second function 920). Thus, in this example, an athlete's corresponding normalized value increases less rapidly for player point values as they rise above the mean μ, as compared with a top portion of the curve in which a smoothing function was not applied. Likewise, in this example, an athlete's corresponding normalized value decreases more rapidly for player point values as they fall above the mean μ, as compared with a bottom portion of the curve in which a smoothing function was not applied.

Referring back to FIG. 2, at step 235 the processor 110 executing one or more software modules 130, including preferably, the PPV normalization application 150, configures the computing device 105 to convert the calculated player point values into normalized values based on one or more piecewise-defined non-linear functions. More specifically, the calculated player point value for each athlete on a user roster during the preceding event interval is converted into a normalized value for each athlete based on the one or more piecewise-defined non-linear functions specific to the athlete's sport and/or position. In one or more implementations, the software components (e.g., PPV normalization application 150) for conversion of the player point values into normalized values can be implemented using SQL and/or PLSQL. As discussed above, in one or more implementations the one or more piecewise-defined non-linear functions can be defined by equations 1-3 above.

At step 240, the processor 110 executing one or more software modules 130, configures the computing device 105 to calculate a roster score for each user. The roster score can be determined via any number of ways of tallying or aggregating the scores (normalized values) of the athletes on each user roster for one or more of the preceding event intervals. This can include but is not limited to the sum of the normalized values for each player on a user's roster, the average of all the normalized values on the roster, or a weighted average of all the normalized values on the roster. In certain implementations, each user may have a roster that comprises both active players and non-active players ("bench" players), such that the bench players do not contribute the score of the user's roster during the time (e.g., one or more event intervals) in which they are on the "bench." In one or more such implementations, the roster score can thus be an aggregate of the normalized values of only the active players for the particular event interval.

With continued reference to FIG. 2, at step 245 the processor 110 executing one or more software modules 130, configures the computing device 105 to rank each participating user in the challenge based on their roster score. In one or more implementations, a user ranking can be determined at the conclusion of each event interval of the challenge. In at least one implementation, the user ranking can be determined only at the conclusion of the entire challenge. The user ranking can be determined via any number of ways depending on the predetermined rules of the particular challenge. For example, the user ranking can be based on an aggregate of all the normalized values earned by active players during all of the event intervals of the challenge. In another implementation, each user could face-off against a different user for each event interval of the challenge, and the user ranking at the end of the challenge can be based on the number of times each user had a greater roster score than the opponent at the end of an event interval (i.e., each time a user "won" against his or her opponent for each event interval). In yet another implementation, the user ranking can be based on how each participating user's roster score compared with one or more other participating user's roster score for one or more specific, predetermined event intervals (e.g., playoff rounds).

With continued reference to FIG. 2, at step 250, the processor 110 executing one or more software modules 130, configures the computing device 105 to record one or more winners of the challenge (challenge) based on the user rankings at the end of the challenge (e.g., at the end of one or more event intervals). In one or more implementations, the processor can configure the computing device 105 to record the one or more winners of the challenge in memory 120 and/or storage 125. At step 255, the processor 110 executing one or more software modules 130, configures the computing device 105 to provide the ranking to a plurality of users. In one or more implementations, the rankings can be provided from the computing device 105 to the participating users' computing device(s) over a network 135. In at least one implementation, the rankings can be provided to one or more users who did not participate in the particular challenge.

It should be understood that although much of the foregoing description has been directed to systems and methods for providing an inter-sport fantasy sports challenge, the system and methods disclosed herein can be similarly deployed and/or implemented in scenarios, situations, and settings far beyond the referenced scenarios. It can be readily appreciated that inter-sport fantasy sports challenge system 100 can be effectively employed in one or more scenarios where in-person, real-world transactions can have advantages over virtual or electronic methods. It should be further understood that any such implementation and/or deployment is within the scope of the system and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems and methods disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for providing a fantasy sports challenge to a plurality of users in which a performance of respective players is assessed in respective sports among a plurality of different sports, the method comprising:
    commencing, with a processor, the fantasy sports challenge by permitting the plurality of users using respective user computing devices to join the challenge;
    providing over a communication network to each of the plurality of users, a set of players, wherein each of the players in the set competes in a respective sport among the plurality of different sports;
    receiving from each of the users over the communication network, a respective roster comprising a selection of players among the set of players, wherein each roster includes a prescribed number of players selected without regard to the respective sport and a respective position, and wherein the respective rosters as between at least two of the users includes players from one or more of the plurality of the different sports;
    receiving performance data relating to each one of the players during a preceding event interval;
    calculating, with the processor, a respective player point value for each of the players based on the received performance data using a fantasy scoring methodology for the respective sport in which the player competes;
    converting, with the processor, each calculated player point value into a normalized value on a common point value scale by inputting each said calculated player point value into a plurality of piecewise-defined non-linear functions, wherein each of the piecewise defined non-linear functions is defined for a respective one of the plurality of sports;
    calculating, with the processor, a respective roster score for each user by aggregating the normalized values for each of the players on the roster of each user;
    ranking, with the processor, the plurality of users based on the calculated roster scores; and
    concluding the challenge by recording, with the processor in memory, one or more winners of the challenge based on the ranking; and
    providing the ranking to the plurality of users by the processor over a network.

2. The method of claim 1, further comprising:
    constructing, in the memory, at least one of the piecewise-defined non-linear functions for each of the plurality of sports, wherein the at least one piecewise-defined non-linear function is a continuous function.

3. The method of claim 2, further comprising:
    wherein a domain of the piecewise-defined non-linear function for a particular sport is a point scale of the fantasy point scoring methodology for the particular sport,
    wherein a range of the piecewise-defined non-linear function is the common point value scale and has a minimum normalized value and a maximum normalized value,
    wherein the piecewise defined non-linear function comprises a transition value, wherein the transition value is a mean of player point values for a plurality of players of the particular sport, and wherein a player-point value that is equal to the mean is assigned a pre-defined normalized value on the common point value scale (center value),
    wherein the piecewise-defined non-linear function comprises a first function that is applied to convert a calculated player point value to the normalized value when the calculated player point value is less than the mean, and wherein the piecewise defined non-linear function comprises a second function that is applied to convert the calculated player point value to the normalized value when the calculated player point value is greater than the mean.

4. The method of claim 3, wherein the first function defines a non-linear rate at which normalized points are subtracted from the center value to obtain the normalized value, and wherein the second function defines a non-linear rate at which normalized points are added to the center value to obtain the normalized value.

5. The method of claim 4, wherein the non-linear rate of the first function is a function of a prescribed number of standard deviations below the mean of player point values for the particular sport that is required to award a prescribed percentage of normalized points below the center value, and wherein the non-linear rate of the second function is a function of a prescribed number of standard deviations above the mean of player point values for the particular sport that is required to award a prescribed percentage of normalized points above the center value.

6. The method of claim 3, wherein constructing the piecewise-defined non-linear function for the particular sport further comprises:
   receiving historical performance data relating to the set of players for one or more event intervals within a pre-defined look-back period;
   identifying a subset of players, among the set of players, that play the particular sport and that are statistically relevant during the pre-defined look-back period;
   calculating player point values for each of the players in the subset for the one or more event intervals, wherein the player point values are calculated by applying the fantasy scoring methodology for the particular sport to the received historical performance data; and
   calculating the mean and a standard deviation of the calculated player point values for each respective sport.

7. The method of claim 6, wherein the piecewise-defined linear functions are represented by the equation:

for $x > \mu : y = a(1 - c1^{((x-\mu)/\sigma)}) + b$, for $x = \mu : y = b$, for $x < \mu : y = d(-1 + c2^{((\mu-x)/\sigma)}) + b$, wherein x is the calculated player point value, y is the normalized value, $\mu$ is the calculated mean, $\sigma$ is the calculated standard deviation, and wherein c1 is a constant that is a function of the prescribed number of standard deviations above the mean and c2 is a constant that is a function of the prescribed number of standard deviations below the mean; and wherein a is equal to the maximum value minus the center value, which is the number of points that can be earned above the center value, b is the center value, and d is equal to the center value minus the minimum value, which is the number of points that can be lost below the center value.

8. The method of claim 7, further comprising applying at least one smoothing function to the piecewise-defined non-linear functions, wherein the at least one smoothing function modifies the slope of the piecewise-defined non-linear functions for a prescribed range of calculated player point values below the transition value.

9. The method of claim 6, wherein the step of identifying the subset further comprises: including one or more players in the subset based on the one or more players' participation in one or more sporting events during the one or more event intervals.

10. The method of claim 9, wherein the step of identifying the subset further comprises: excluding the calculated player point values that are statistical outliers from the calculation of the mean and the standard deviation.

11. The method of claim 10, wherein statistical outliers include one or more of: a first percentage of the highest calculated player point values and a second percentage of the lowest calculated player point values during the look-back period.

12. The method of claim 6, wherein the look-back period is one or more of: a prescribed time period and a prescribed number of sporting events.

13. The method of claim 1, wherein the preceding event interval is one or more of: a prescribed time period and a prescribed number of sporting events.

14. The method of claim 1, further comprising:
   conducting, with the processor over the communication network, a real-time player selection process, including:
      prompting each of the users to select players among the set of players provided to each of the users; and
      populating, with the processor, the respective rosters with the received respective selections, wherein the respective rosters are populated without regard to the respective sport associated with the selected players.

15. The method of claim 14, wherein the real-time player selection process further comprises:
   testing each received respective selection; and
   accepting each received respective selection when the respective roster does not exceed a salary cap.

16. The method of claim 14, wherein the real-time player selection process further comprises:
   displaying to each of the users a set of available players;
   iteratively prompting each of the users, individually and according to a predefined order, to select one player among the set of available players;
   updating the set of available players available in the prompting step in response to each of the received selections; and
   displaying the updated set of available players to the users.

17. A method for providing a fantasy sports challenge to a plurality of users in which a performance of respective players is assessed in respective sports among a plurality of different sports, the method comprising:
   commencing, with a processor, the fantasy sports challenge by permitting the plurality of users using respective user computing devices to join the challenge;
   providing over a communication network to each of the plurality of users, a set of players, wherein each of the players in the set competes in a respective sport among the plurality of different sports in a respective position;
   receiving from each of the users over the communication network, a respective roster comprising a selection of players among the set of players, wherein each roster includes a prescribed number of players having prescribed positions, and wherein the respective rosters as between at least two of the users includes players from two or more of the plurality of the different sports;
   receiving performance data relating to each one of the players during a preceding event interval;
   calculating, with the processor, a respective player point value for each of the players based on the received performance data using a fantasy scoring methodology for the respective sport in which the player competes;

converting, with the processor, each calculated player point value into a normalized value on a common point value scale by inputting each said calculated player point value into a plurality of piecewise-defined non-linear functions, wherein each of the piecewise defined non-linear functions is defined for a respective one of the plurality of sports;

calculating, with the processor, a respective roster score for each user by aggregating the normalized values for each of the players on the roster of each user;

ranking, with the processor, the plurality of users based on the calculated roster scores; and concluding the challenge by recording, with the processor in memory, one or more winners of the challenge based on the ranking; and providing the ranking to the plurality of users by the processor over a network.

18. The method of claim 17, further comprising:

constructing, in the memory, at least one of the piecewise-defined non-linear functions for each of the plurality of sports, wherein the at least one piecewise-defined non-linear function is a continuous function, wherein a domain of the piecewise-defined non-linear function for a particular sport is a point scale of the fantasy point scoring methodology for the particular sport wherein a range of the piecewise-defined non-linear function is the common point value scale and has a minimum normalized value and a maximum normalized value, wherein the piecewise defined non-linear function comprises a transition value, wherein the transition value is a mean of player point values for a plurality of players of the particular sport, and wherein a player-point value that is equal to the mean is assigned a pre-defined normalized value on the common point value scale (center value), wherein the piecewise-defined non-linear function comprises a first function that is applied to convert a calculated player point value to the normalized value when the calculated player point value is less than the mean, and wherein the piecewise defined non-linear function comprises a second function that is applied to convert the calculated player point value to the normalized value when the calculated player point value is greater than the mean.

19. The method of claim 18, wherein constructing the piecewise-defined non-linear function for the particular sport further comprises:

receiving historical performance data relating to the set of players for one or more event intervals within a pre-defined look-back period;

identifying a subset of players, among the set of players, that play the particular sport and that are statistically relevant during the pre-defined look-back period;

calculating player point values for each of the players in the subset for the one or more event intervals, wherein the player point values are calculated by applying the fantasy scoring methodology for the particular sport to the received historical performance data; and calculating the mean and a standard deviation of the calculated player point values for each respective sport.

20. The method of claim 19, wherein the piecewise-defined linear functions are represented by the equation:

$$\text{for } x > \mu : y = a(1 - c1\textasciicircum((x-\mu)/\sigma)) + b,$$

$$\text{for } x = \mu : y = b,$$

$$\text{for } x < \mu : y = d(-1 + c2\textasciicircum((\mu-x)/\sigma)) + b,$$

wherein x is the calculated player point value, y is the normalized value, $\mu$ is the calculated mean, $\sigma$ is the calculated standard deviation, and wherein c1 is a constant that is a function of the prescribed number of standard deviations above the mean and c2 is a constant that is a function of the prescribed number of standard deviations below the mean; and wherein a is equal to the maximum value minus the center value, which is the number of points that can be earned above the center value, b is the center value, and d is equal to the center value minus the minimum value, which is the number of points that can be lost below the center value.

* * * * *

UNITED STATES PATENT AND TRADEMARK OFFICE
CERTIFICATE OF CORRECTION

| | | |
|---|---|---|
| PATENT NO. | : 9,358,469 B1 | Page 1 of 1 |
| APPLICATION NO. | : 14/794467 | |
| DATED | : June 7, 2016 | |
| INVENTOR(S) | : Christopher J. Nicholas et al. | |

It is certified that error appears in the above-identified patent and that said Letters Patent is hereby corrected as shown below:

Title page item (73), Assignee, Line 1:
"SPORTS TECHNOLOGIES LLC Canton, Connecticut" should be -- SportsHub Technologies, LLC Saint Paul, MN --.

Signed and Sealed this
Second Day of August, 2016

Michelle K. Lee
*Director of the United States Patent and Trademark Office*